Nov. 6, 1962 — T. A. STEHLIN — 3,062,496
PISTON VALVE
Filed Feb. 20, 1959
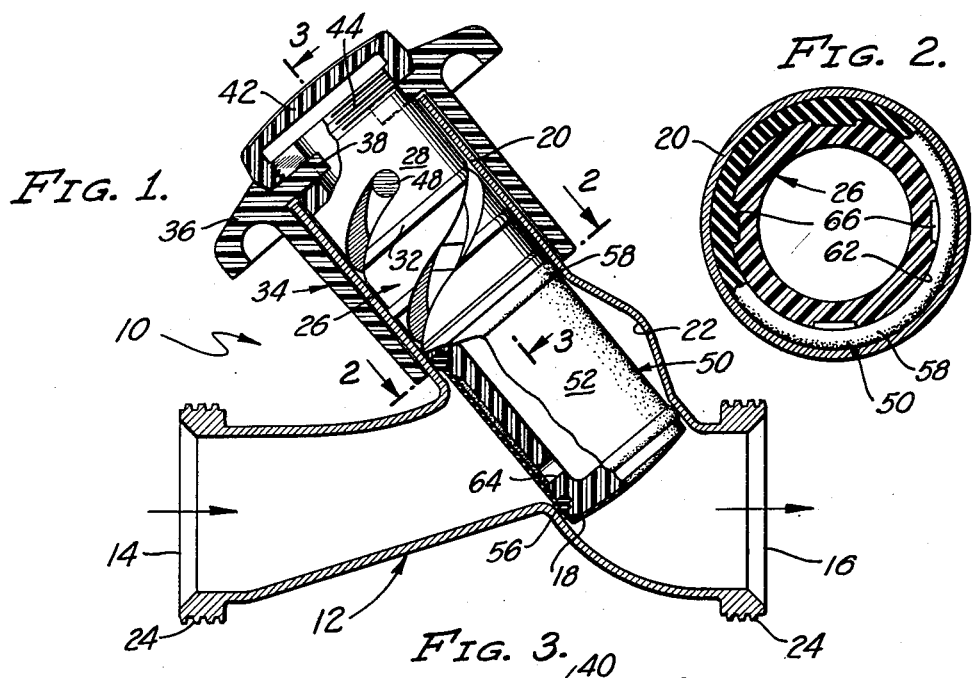
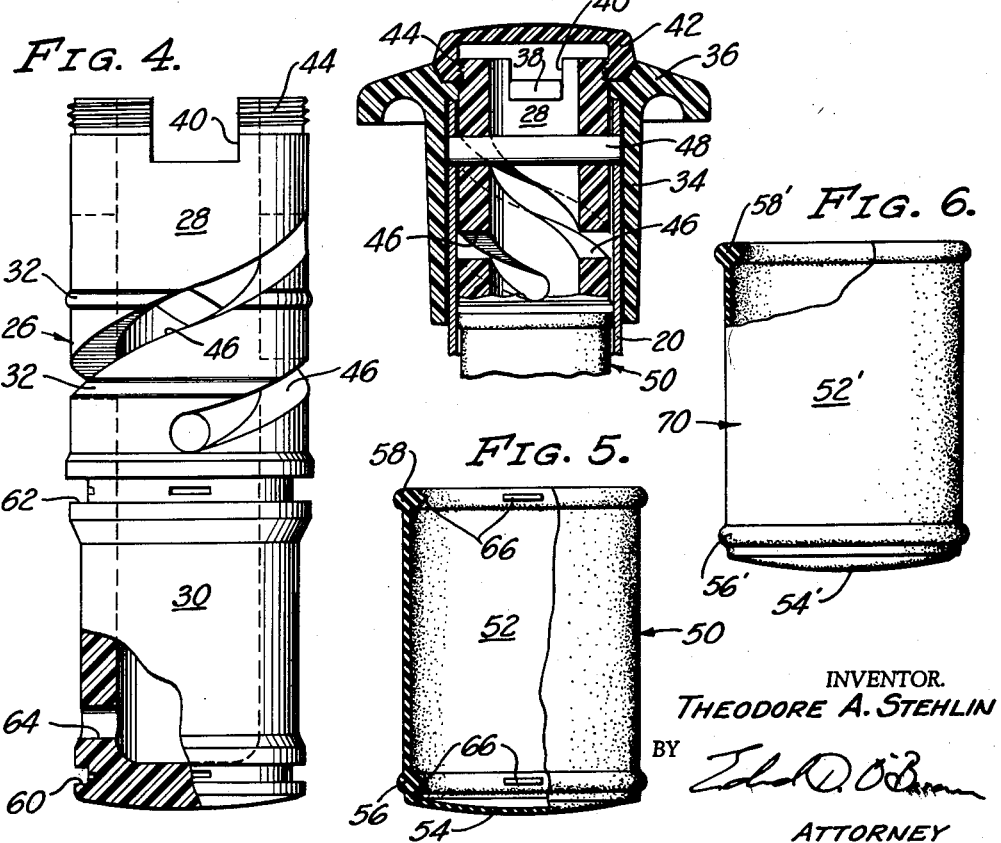
INVENTOR.
THEODORE A. STEHLIN
BY
ATTORNEY 3,062,496
PISTON VALVE
Theodore A. Stehlin, Pasadena, Calif., assignor to St-West, Inc., Carson City, Nev., a corporation of Nevada
Filed Feb. 20, 1959, Ser. No. 794,576
13 Claims. (Cl. 251—218)

This invention pertains to new and improved valves. More specifically it pertains to valves which are specifically adapted to be used in the food industry.

Valves for use in the food industry must differ from conventional valves in several exceedingly important regards. In the food field cleanliness is extremely important. Hence, any valve to be used in this field must be capable of being easily disassembled for cleaning purposes. It is also important that any valve for use in the food field be constructed in such a manner that there is substantially no possibility of material flowing through the valve remaining in the valve itself during the periods when the valve is not in use. Such material remaining in a valve in the food industry would be apt to ferment so as to contaminate material subsequently flowing through the valve itself. A related problem with respect to valves for use with foodstuffs is that such valves must be constructed so that no material will "hang up" within such valves so as to remain in them for a prolonged period.

An object of this invention is to provide new and improved valves which are primarily adapted to be used in the food industry but which can be employed in other fields. Thus, the valves of this invention are particularly adapted for use in the pharmaceutical industry and in other industries where cleanliness is of extreme importance.

Another object of this invention is to provide valves which are constructed so that material will not be held within such valves for prolonged periods when they are not being used. A further object of this invention is to provide valves of the general type described which are relatively inexpensive to manufacture, and which are extremely reliable in use.

These and further objects of the invention will be fully apparent to those skilled in the art to which this invention pertains from a detailed consideration of the remainder of this description including the appended claims and the accompanying drawing in which:

FIG. 1 is a side cross-sectional view of a valve of this invention;

FIG. 2 is a cross-sectional view taken at line 2—2 of FIG. 1;

FIG. 3 is a cross-sectional view taken at line 3—3 of FIG. 1;

FIG. 4 is a side elevational view, partially in section, of a part of this valve;

FIG. 5 is a side elevational view, partially in section, of another part of this valve; and FIG. 6 is a side elevational view, partially in section, of a part which, if desired, can be used instead of the part shown in FIG. 5 within valves of this invention.

In all figures of the drawing like numerals are used to designate like parts wherever convenient for purposes of illustration and explanation. It is to be understood that the accompanying drawing is not to be taken as limiting this invention inasmuch as a number of differently appearing valves utilizing the essential features or principles of this invention as hereafter explained may be readily designed through the utilization of routine engineering skill.

As an aid to understanding this invention it may be stated in essentially summary form that it concerns valves, each of which includes a valve casing having an inlet and an outlet connected to each other so that fluid transversing the valve passes through cylindrical seat formed within this casing. The axis of the valve seat is aligned with the axis of a cylindrical body formed in the casing so as to be spaced from the valve seat. This cylindrical body has an open top and carries what is commonly referred to as a poppet. Within the valves of this invention means are provided on the cylindrical body for rotating this poppet. Further, the poppet is formed so as to include a pair of helical grooves traversed by pin means mounted within the cylindrical body. With this type of construction the poppet itself may be easily moved along through its axis by rotation of the means attached to it so that the lower extremity of the poppet may be placed within the cylindrical valve seat when a valve of this invention is closed. This extremity of the poppet is formed so as to carry, in accordance with this invention, an elastomeric boot designed so as to form at all times a seal between the poppet and the cylindrical body and a seal within the valve seat when the valve is in a closed position.

This invention is best more fully described by referring directly to the accompanying drawing in which there is shown a valve 10 of the present invention including a valve casing 12 having an inlet 14 and an outlet 16 which are connected together so that fluid passing through the casing 12 passes through a generally cylindrical valve seat 18. The valve seat 18 is preferably aligned with the axis of a cylindrical body 20 formed as an integral part of the casing 12. Preferably this casing 12 includes an enlarged section 22 extending around the interior of the casing 12 between the valve seat 18 and the body 20.

The casing 12 may be formed out of any conventional material such as stainless steel, or the like. Preferably this casing is formed as described in the co-pending application Serial No. 455,645, filed September 13, 1954, now Patent No. 2,896,905, entitled "Prefabricated Valve." The disclosure of this co-pending application is incorporated herein by reference. When the casing 12 is formed as described in this co-pending application or in other manners it preferably has a completely smooth interior configuration which prevents any possibility of material passing through the valve 10 from "hanging up" or remaining stationary within this casing 12.

In order to complete the casing 12 threaded ferrules 24 or other equivalent structures may be located around the inlet 14 and the outlet 16 for use in attaching the valve 10 in an operative position. Although in the valve 10 shown the inlet 14 and the outlet 16 are aligned with one another these two parts may be located at right angles to one another if so desired.

Within the casing 12 there is located a poppet 26 having a generally cylindrical upper section 28 and having an aligned generally cylindrical lower section 30 of smaller diameter than the upper section 28. Preferably annular ribs 32 formed on the exterior of the upper section 28 so as to extend completely around it engage the interior of the cylindrical body 20 so as to accurately position this poppet 26 so that the common axis of the sections 28 and 30 is aligned with the axis of the body 20 and of the valve seat 18. The use of the ribs 32 is advantageous because these ribs enable the poppet 26 to be positioned in this manner while simultaneously allowing the poppet 26 to be moved back and forth within the casing 10 with a minimum amount of friction being developed which opposes such movement.

Such movement is accomplished through the use of a general cup shaped sleeve 34 which fits around the exterior of the body 20 so that an end 36 of this sleeve is adjacent the end of the body 20. This end 36 is provided with projections 38 which fit within an enlarged slot 40 within the end of the upper section 28 of the poppet 26. Preferably the projections 38 are held in place through the use of a threaded cap 42 which engages threads 44 on the end of the upper section 28 of the poppet 26.

With this type of construction as the sleeve 34 is rotated through the engagement of the end 36 of it by hand, such rotation is transmitted through the projections 38 engaging the sides of the slot 40 so as to cause corresponding rotation of the poppet 26. This rotation of the poppet 26 results in movement of this poppet 26 along its axis because of the use of a pin and slot structure as is best seen in FIG. 1 of the drawing. In order to permit such movement the upper section 28 of the poppet 26 is provided with a pair of helical grooves 46 located on the opposite sides of the poppet 26 so that as the poppet 26 is turned the sides of these grooves are engaged by a pin 48 mounted on the body 20 at right angles to the axis of this body so as to intersect this axis.

Movement of the poppet 26 in the manner described causes the lower section of this poppet to move with respect to valve seat 18. Because of the manner in which the poppet 26 is constructed, alone it is incapable of forming a satisfactory seal within the valve seat 18 and within the body 20. In order to form such a seal with this invention a boot 50 as shown in FIG. 5 of the drawing is preferably employed with this invention. This boot may be formed out of natural or synthetic rubber or other various equivalent elastomeric materials.

It (the boot 50) is generally cup shaped and includes a cylindrical wall 52 and an enclosed bottom end wall 54. At the juncture of these walls 52 and 54 a sealing ring 56 is formed integrally with these walls so as to extend generally both to the interior and to the exterior of the boot 50. Another similar sealing ring 58 is formed at the end of the wall 52 remote from the bottom 54. Both of these rings 56 preferably extend in planes at right angles to the axis of the complete boot 50; preferably both of these rings have a circular cross-sectional configuration as shown.

These rings 56 and 58 are adapted to fit within grooves 60 and 62, respectively, in the poppet 26 when the boot 50 is placed over the lower extremity 30 of this poppet by the simple expedient of temporarily deforming it. The entrapment of air within the boot 50 during this operation is prevented by means of a hole 64 leading to the interior of the poppet 26 located within the end 32 as shown in FIG. 4 of the drawing.

In order to prevent the boot 50 from moving in an undesired manner during the use of the valve 10 it is preferred to form on the rings 56 and 58 internal projections 66 which fit within correspondingly shaped openings in the bases of the grooves 60 and 62. These projections 66 effectively lock the rings 56 and 58 into position so as to prevent any chance of their moving with respect to the poppet 26 during the use of the valve 10.

The construction of the boot 50 is considered particularly advantageous for a variety of reasons. In prior valves similar to the valve 10 conventional O-rings or other similar elastomeric seals have been used within the grooves. Such seals have tended to come out of these grooves when used. With the construction shown the boot 50 is effectively locked in place so that it will not bind up within the interior of the valve 10 and so that the seals created by the rings 56 and 58 are always operative.

If desired it is possible to form a modified boot 70 of the present invention as shown in FIG. 6 of the drawing. This modified boot is substantially the same as the boot 50 previously described except for the omission of the projections 66. For this reason the various parts of the modified boot 70 are identified by the primes of the numerals previously used. Both the boots 50 and 70 are extremely advantageous for use with the present invention inasmuch as they effectively form a seal within a valve such as the valve 10 so as to prevent material from passing through the valve from getting into the operative parts of this valve, and inasmuch as they effectively form another seal when a valve of this nature is closed.

Such boots, and the other parts of valves as herein described may be easily taken apart for cleaning purposes. The type of structure herein described is also desirable in preventing contamination resulting from material "hanging up" or remaining in a valve.

Because of the nature of this invention and the fact that valves as herein described are susceptible of many modifications, this invention is to be considered as being limited only by the appended claims forming a part of this disclosure.

This application is a continuation-in-part of the co-pending application, Serial No. 613,400, filed October 2, 1956, entitled "Prefabricated Valve," now abandoned. The disclosure of this co-pending application is incorporated herein by reference.

I claim:

1. A valve which includes: a valve casing having an inlet and an outlet connected together, said valve casing including a cylindrical valve seat formed within said casing between said inlet and said outlet, said valve casing also including a cylindrical body formed in said casing so as to be spaced from said valve seat, said cylindrical body having open top; a poppet located within said cylindrical body; means for rotating said poppet attached to said poppet, said means being positioned exteriorly of said casing; means for causing movement of said poppet along the axis of said body when said poppet is rotated within said cylindrical body; and a single imperforate elastomeric sealing means carried by said poppet, said sealing means covering said poppet within said casing and forming a seal between said poppet and said cylindrical body at all times and between said poppet and said valve seat when said poppet is moved so that part of said poppet is located generally within said valve seat said sealing means comprising a boot formed out of an elastomeric material, said boot including a cylindrical wall, a bottom end wall, a sealing ring located at the juncture of said cylindrical wall and said bottom end wall and a sealing ring located at the extremity of said cylindrical wall remote from said bottom end wall, said sealing rings each having a circular cross sectional configuration, said boot fitting over a portion of said poppet.

2. A valve as defined in claim 1 including coacting holding means formed on said sealing rings and on said poppet, said holding means serving to prevent movement between said boot and said poppet during movement of said poppet within said valve.

3. A valve as defined in claim 2 wherein said holding means on said sealing rings comprise projections extending from said rings and wherein said holding means on said poppet comprise openings in said poppet, said projections fitting within said openings in said poppet.

4. A valve which includes: a valve casing having an inlet and an outlet connected together, said valve casing including a cylindrical valve seat formed within said casing between said inlet and said outlet, said valve casing also including a cylindrical body formed in said casing so as to be spaced from said valve seat, the axis of said cylindrical body being co-incident with the axis of said cylindrical valve seat, said cylindrical body having an open end remote from said valve seat; a poppet located within said cylindrical body, so as to extend therefrom toward said valve seat, said poppet including a generally cylindrical upper section located within said cylindrical body and a generally cylindrical lower section of smaller diameter than said upper section located adjacent to said valve seat, the axes of said sections of said poppet being aligned with the axis of said cylindrical body, the end of said upper section of said poppet adjacent to said open end of said cylindrical body including an enlarged slot formed therein said upper section of said poppet also being formed so as to include a pair of helical grooves located therein, said lower section of said poppet being formed so as to include other grooves extending completely around said poppet, one of said other grooves being located adjacent to the end of said poppet adjacent to said valve seat and the other of said other grooves being located adjacent to said upper section of said poppet; pin means mounted within said cylindrical body, said pin means extending through said helical grooves within said poppet; sleeve means fitting around said cylindrical body, said sleeve means including projection means fitting within said slot within said poppet; means holding said projections on said sleeve within said slot in said poppet, said means being attached to said poppet; and a sealing boot formed out of an elastomeric material, said boot including a cylindrical wall and a bottom end wall, a sealing ring located at the juncture of said cylindrical wall and said bottom end wall and a sealing ring located at the extremity of said cylindrical wall remote from said bottom end wall, said sealing rings each having a circular cross sectional configuration and extending from each side of said cylindrical wall of said boot, said sealing rings fitting within said other grooves in said lower section of said poppet and extending therefrom, said boot fitting over said lower extremity of said poppet so as to separate said poppet from the interior of said valve casing between said inlet and said outlet, one of said sealing rings of said boot engaging the interior of said cylindrical body so as to form a seal therewith at all times, the other of said sealing rings of said boot being capable of engaging said cylindrical valve seat so as to form a seal therewith when said poppet is moved through rotation of said sleeve means so that an end of the lower section of said poppet extends generally within said cylindrical valve seat.

5. A sealing boot for use in a valve, said boot being formed out of an elastomeric material, said boot including an imperforate cylindrical wall, an imperforate bottom end wall, a sealing ring located at the juncture of said cylindrical wall and said bottom end wall, and a sealing ring located at the extremity of said cylindrical wall remote from said bottom end wall said sealing rings extending from said walls both internally and externally of said boot.

6. A sealing boot as defined in claim 5 wherein said sealing rings each have a circular cross sectional configuration.

7. A sealing boot as defined in claim 6 including projection means formed on each of said sealing rings, said projection means extending from said sealing rings toward the interior of said boot.

8. A valve which includes: a valve casing having an inlet and an outlet connected together, said valve casing including a tubular valve seat formed within said casing between said inlet and said outlet, said valve casing also including tubular body formed in said casing so as to be spaced from said valve seat and being in alignment therewith; a poppet located within said tubular body, said poppet being capable of being moved so as to extend from said body into said interior of said tubular valve seat; means for moving said poppet from an open position within said tubular body to a closed position in which said poppet extends from said tubular body to within said tubular valve seat, said means also being for movement of said poppet from said closed position to said open position; and a single imperforate sealing means formed out of an elastomeric material located around and covering said poppet and being carried by said poppet, said sealing means being capable of forming a seal between said poppet and said tubular body at all times and between said poppet and the interior of said valve seat when said poppet is moved so as to extend into said valve seat, said sealing means comprising a boot formed out of an elastomeric material, said boot including a tubular wall fitting around said poppet, said tubular wall having ends, a bottom end wall extending across the extremity of said poppet adjacent to said valve seat, and a sealing ring located at the juncture of said tubular wall and said bottom end wall and another sealing ring located at the extremity of said tubular wall remote from said bottom end wall, said sealing rings each having a circular cross-sectional configuration, said first mentioned sealing ring being capable of forming a seal with the interior of said valve seat, said second sealing ring being capable of forming a sealing with the interior of said tubular body at all times, said boot fitting over a portion of said poppet.

9. A valve as defined in claim 8 including coacting holding means formed on said sealing rings and on said poppet, said holding means serving to prevent movement between said boot and said poppet during movement of said poppet within said valve.

10. A valve as defined in claim 8 wherein said holding means on said sealing rings comprise projections extending from said rings and wherein said holding means on said poppet comprise openings in said poppet, said projections fitting within said openings in said poppet.

11. A sealing boot for use in a valve, said boot being formed out of an elastomeric material so as to include an imperforate tubular wall, an imperforate bottom end wall attached to an extremity of said tubular wall, a sealing ring located at the juncture of said tubular wall and said bottom end wall and a sealing ring located at the extremity of said tubular wall remote from said bottom end wall, said sealing rings extend from both sides of said walls.

12. A sealing boot as defined in claim 11 wherein said sealing rings each have a circular cross-sectional configuration.

13. A sealing boot as defined in claim 12 including projection means formed on each of said sealing rings, said projection means extending from said sealing ring toward the interior of said boot.

References Cited in the file of this patent

UNITED STATES PATENTS

| | | |
|---|---|---|
| 1,713,671 | McLaren | May 21, 1929 |
| 2,207,672 | Levey | July 9, 1940 |
| 2,343,584 | Scheele | Mar. 7, 1944 |

FOREIGN PATENTS

| | | |
|---|---|---|
| 190,541 | Germany | Oct. 30, 1907 |
| 524,810 | Belgium | 1953 |
| 657,056 | Great Britain | 1951 |